Nov. 25, 1969  W. P. DAVIDSON  3,480,263

AIR HUMIDIFIER AND FILTER

Filed Oct. 2, 1967  2 Sheets-Sheet 1

INVENTOR
WATSON P. DAVIDSON
By Harbaugh & Thomas
Attorneys

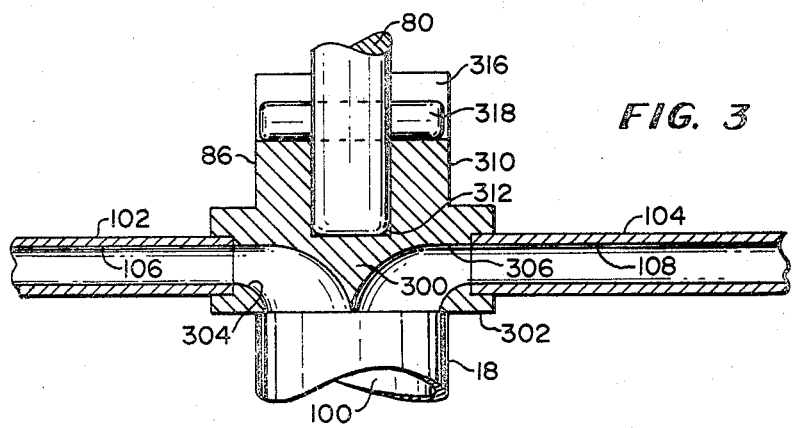
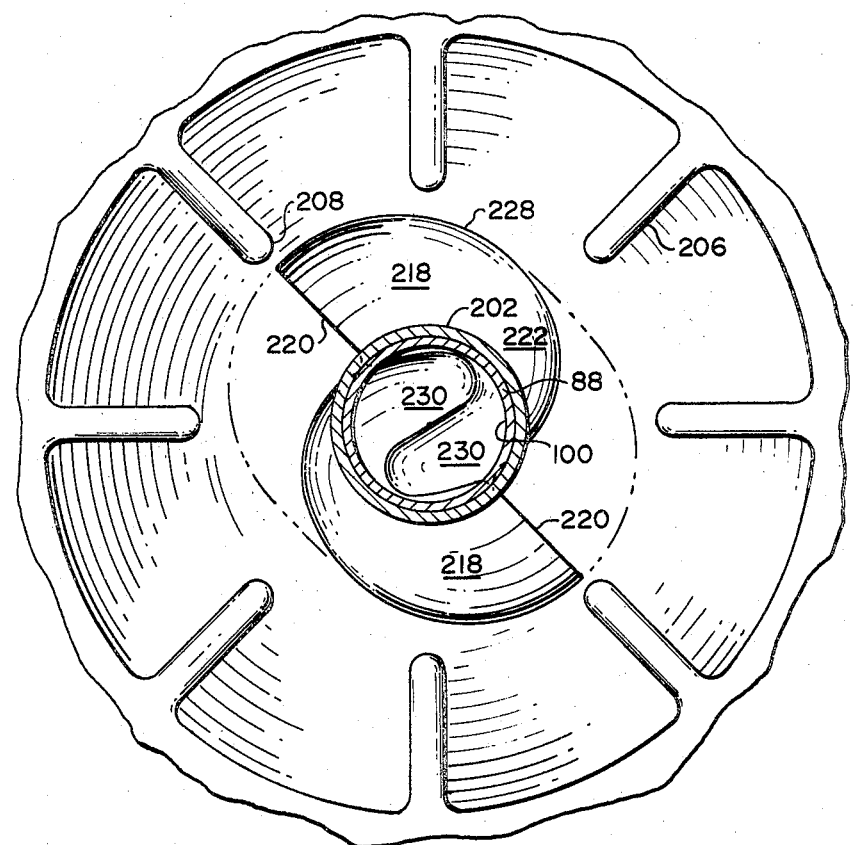

United States Patent Office 3,480,263
Patented Nov. 25, 1969

3,480,263
AIR HUMIDIFIER AND FILTER
Watson P. Davidson, 516 Summit Ave.,
St. Paul, Minn. 55102
Filed Oct. 2, 1967, Ser. No. 672,157
Int. Cl. B01d 47/02; F24f 3/14
U.S. Cl. 261—29                    12 Claims

ABSTRACT OF THE DISCLOSURE

An easily cleaned air humidifier and filter which turbulates forced air in co-current or counter-current contact through a column of repeated alternate stations of misting and cascading water for intimate moisture-air contact accomplished by means of a blower and vertically spaced alternating coaxial conical baffles and rotating discs. The preferred embodiment is a portable unit for home or office use having readily assembled and disassembled parts that are easy to clean and includes a hollow shaft outlet riser conduit for a self-cleaning, self-contained intake impeller pump at the lower end and a centrifugal misting impeller pump booster at the upper end to cycle water and air through the system. Modifications are disclosed.

Background of the invention

A cascade of water through air, in one or more stages has been employed in ornamental fountains, for the creation of an artificial display or for the purpose of obtaining intimate liquid-vapor contact as in air cleaners, water coolers, gas-liquid absorption or reaction equipment, or distillation systems.

Intimate liquid-vapor contact is also obtained by passing water, for example, onto a pumping and vaporizing element in the form of an inverted cone having its apex extending into a water sump and its outer surface provided with curved grooves which lift the water to the upper base and fling it through the path of ascending air. Misting devices or atomizers are employed in a similar manner in juxtaposition to the exit opening of a downcomer in the solvent extraction art. Other forms of air conditioners use a spirally threaded cone in the shape of a continuous rotating scoop or draw the air by means of a fan through a mat of plastic fibers through which water is cascading.

High capacity commercial units of this type are subject to periodic maintenance and shut-down for cleaning, inspection and replacement of worn, or fouled corroded parts, particularly filter mats. This not only requires special tools and skills but necessitates the use of particular cleaning techniques or compositions adapted to remove accumulations of mineral deposits, dirt, films of bacteria and the like from intricate filters, recesses, conduits and contact surfaces. In any system where air and water are passed in continuous contact and evaporation or washing processes take place, the build-up of such undesirable accumulations occurs in the most inaccessible parts and in those portions where intimate air-liquid contact takes place. Thus air filters, fiber mats, baffle surfaces, contact trays, valves and conduits require periodic cleaning or replacement.

In addition, other deficiencies and limitations attach to air humidifiers and filters, even though they may be designed for home or office use and easy cleaning and maintenance. Their efficiency may depend on the periodic replacement of a fiber or foam plastic mat which is often neglected. They provide non-uniform distribution of feed liquid, insufficient depth of spray pattern and short or void air cycle paths because emphasis is placed on design appearance rather than design efficiency. If an air filter is made to be easily replaced or removed for cleaning, it may not be positioned in the proper relationship to incoming air for most effective filtering action. Similarly, a moving part, such as a fan or liquid spray device, may operate best in a unitized column and lose efficiency when designed to be easily dismantled for inspection or cleaning. In other words, the very features which make the unit compact or suitable for easy maintenance militate against effective and uniform flow velocities, proper air cycling and freedom from pump or bearing failures due to contaminants within the system and variable power requirements.

The present invention is directed to a liquid-vapor contactor as exemplified by an air humidifier and filter which overcomes or mitigates these and related problems. In addition, the present invention provides a readily dismantled and cleaned air humidifier and filter, even to the point of parts contacted by water being cleaned in a household dishwasher, and in which mineral and organic precipitate build-up is reduced to a minimum and any accumulations that do form do not impair the efficiency of operation.

Summary of the invention

The present invention concerns a vaporizer and more particularly an air humidifier and filter for controlling the humidity of the air in an office, home, hospital room or the like. The house includes a base for storing a supply of water, a column of separable mating tubular units supported thereon having coaxial conical baffles; and a liquid distribution zone located at the top. The moving parts comprise a lift pump in the base with a hollow rotating shaft having a plurality of vertically spaced rotating discs extending through the column with the discs alternating with the baffles, and a centrifugating distributor is located at the top in the distribution zone. A single prime mover carrying an air moving impeller, in the distribution zone, detachably drives the shaft assembly. The pump communicates through the shaft with the centrifugating distributor. The centrifugating distributor includes radially disposed rotating conduit-like spray arms which centrifugate the liquid from the top of the hollow shaft and supplies an auxillary pumping and lift action for the pump and water distributing system. The invention is also characterized by the provision of an air filtering and humidifying device which is readily dismantled and cleaned and readily assembled without the use of tools or special skills. Still another feature of this invention is to provide a device of the nature described wherein the major parts can be readily and inexpensively fabricated from thermosetting or thermoplastic materials, requiring little or no initial labor beyond the attachment of impellers to a shaft. Further, each of the disassembled parts is readily scoured and cleaned having a minimum of recesses or bores which may require special treatment.

Accordingly, the primary objects of this invention are to provide an improved, light weight, strong, portable liquid-vapor contactor, air humidifier and filter device and to provide a quiet-operating combined vapor or air distribution and liquid or water misting impeller-pump combination therein, operating from a single power source producing all of the vapor-liquid contact efficiency of a sophisticated commercial air processing column within the confines of a separable, interlocking, multi-zoned column.

As will be more fully described in relation to the preferred embodiments of this invention, the vapor or air being treated or humidified in the apparatus of this invention passes either co-currently or counter-currently through successive contact zones in each of which the intimacy of contact with liquid or water droplets or mist is augmented by a series of alternating baffles and whirling centrifugal impeller discs. Moreover, by providing a self-cleaning, self-contained, cavitation-free impeller at the bottom and an air fan at the top of a hollow rotating shaft, certain design simplifications and improved air flow characteristics are attained in accordance with this invention.

Description of the drawings

The specific embodiment of this invention is shown in the accompanying drawings wherein

FIG. 3 is a partial cross-sectional view of the rotary mister and coupling arrangement of this invention;

FIG. 4 is a top partial sectional view along lines 4—4 of FIG. 2.

The preferred embodiment

Figure 1:
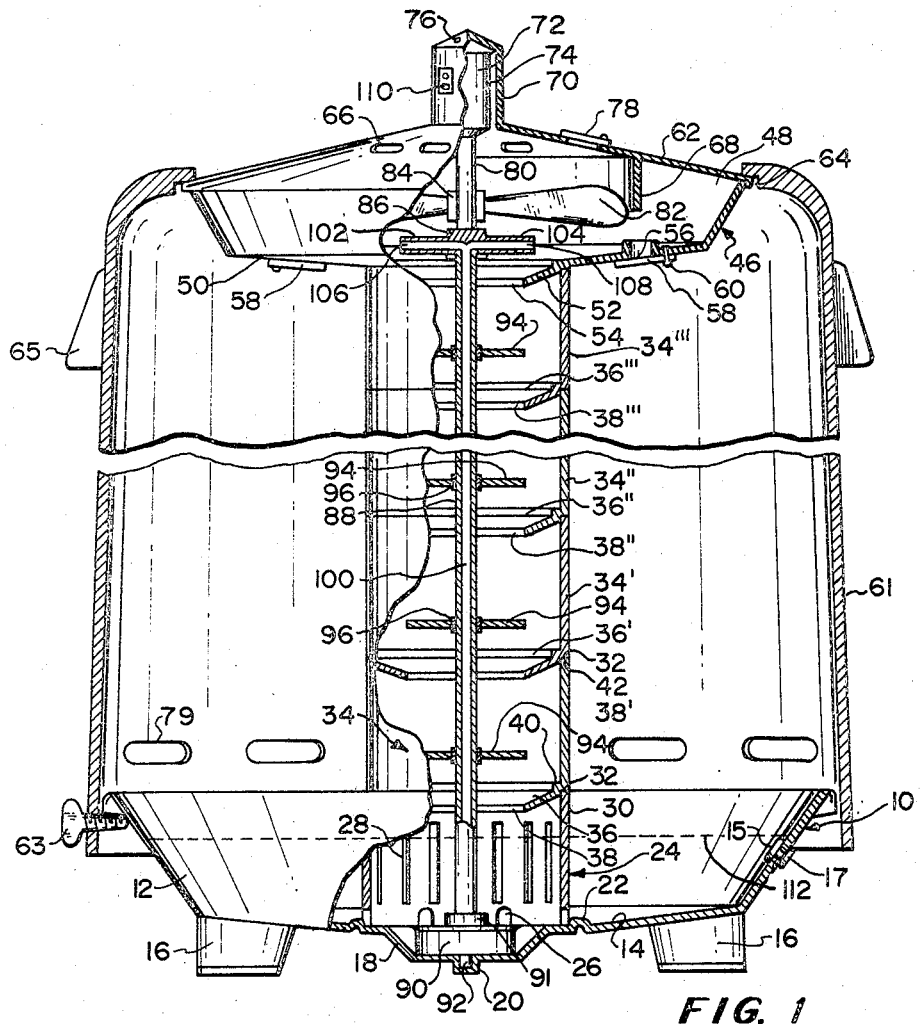
FIG. 1 is a side view in partial axial section illustrating one embodiment of the assembled air humidifier and filter of this invention.

Referring to the drawings, particularly FIG. 1, a humidifier is shown having a base tray 10 formed with a frusto-conical side wall 12 and a conical bottom 14 supported by radial legs 16. The side wall has a drain opening 15 and a removable rubber plug 17 at the desired water level if the base is set in a sink where running water from a faucet is used as a water supply. The central portion of the bottom 14 has a recess or well 18 and a central bearing housing 20. The well 18 is bordered by a series of circumferentially spaced protuberances 22 adapted to receive and retain the lowermost column section 24 in a central position.

The column section 24 is tubular and has a series of circumferentially spaced orifices 26 in the bottom edge and elongated air inlet ports 28 through the tubular side wall which may be of any height desired. The top marginal edge 30 of the tubular column section 24 supports a stacked series of identical sections 34. It engages the circumferential recessed bottom edge 32 of the lowest one of the column sections 34 which as constructed by vacuum forming or casting defines a tubular cross-section conforming therewith and a shallow frusto-conical bottom or baffle member 36 with a central opening 38 therethrough. The baffle 36 joins the bottom edge 32 in an inwardly offset peripheral shoulder 40. The column sections 34 are interchangeable for assembling ease and the presence of the baffles across the bottom prevents the inadvertent placement of a baffle 34 in the tray 10.

The top marginal edge 42 of the column section 34 engages the identical recessed bottom edge 32' of the next column section 34' having the bottom baffle 36' of the same configuration. Two or more column sections 34'' and 34''' complete the baffle column shown in FIG. 1 each section resting on top of the other and each having the same tubular cross-sectional and baffle configuration.

At the top of the column there is provided a tray 46 having a frusto-conical wall 48 and a frusto-conical bottom 50 with an inner frusto-conical baffle 52 having a central opening 54. The central opening 54 is substantially concentric with the openings 38 of the baffles 36 in the column. The bottom 50 has a series of circumferential spaced ports 56 each having a cover member 58 eccentrically mounted on a pin 60 attaching through the bottom 50.

The top tray 46 is fitted with a removable cover 62 through engagement with the flange 64 in a snap fit relationship. The cover 62 has a plurality of air ports 66 within that portion encompassed by the inner circumferential cowling 68. A top housing 70 is provided for the motor 72, held therein by means of the fluted inner sides 74. Top air ports 76 are provided for ventilation of the motor. A bell-shaped cover 61 for the assembly may be provided marginally secured to the tray 20 at latch 63 and having two or more handles 65 thereabout. Eccentrically mounted covers 78 can be used to vary the exhaust openings 66. Air inlet ports 79 of large capacity are provided around the base of cover 61.

A drive shaft 80 extends downwardly from the motor 72, carrying the fan 82 from the hub 84 and engages a detachable coupling 86 to drive the hollow shaft 88 which extends centrally of the passageways 38 to the pump 90 within the well 18. The end 92 of the shaft 88 is carried by the bearing housing 20 which may have a nylon sleeve.

Within each column section 34 there is located a disc 94 affixed to the shaft 88 by means of their individual hubs 96. The operation of the motor 72 rotates the drive shaft 80, the fan 82 and the shaft 88 with the discs 94. The shaft 88 has an internal bore 100 extending from the discharge 91 of the pump 90 to the radial sprayers or misting tubes 102 and 104 and in communication with their internal bores 106 and 108, therein.

A start-stop switch 110 is provided on the top motor housing 70. The necessary electrical conduit to supply AC power to the motor 72 through the switch 110 has been omitted.

The operation of the device shown in FIG. 1 as an air humidifier and filter is as follows: Water is introduced into the bottom tray 10 to the water level line 112 which may be a visible water line marked on the inner side of the wall 12. The openings 28 extend above the water level 112 by an amount sufficient to provide little or no air restriction to the fan 82. The switch 110 is turned on and the fan 82 draws air from the room into the openings 28, across the water surface and up to the column sections 34 by way of the openings 38. Because of the discs 94 the direction of the air is sinuous, changing directions twice in each section with excellent turbulence. The air moves around and through the centrifugal misting tubes 102 and 104 and is propelled out the orifices 66 in the top cover 67.

Simultaneously, the pump 90 forces a head of water up the bore 100 to the misting tubes 102 and 104 where their centrifugal action aids in the pumping of a full flow of water at this height. The misting tubes are rotating at the motor speed and throw a spray of water into and through the column of rising air before it leaves the humidifier. Any water not evaporated in the misting zone 46 collects on the bottom 50 and cascades over onto the first baffle 52 and thence through the opening 54. This falling curtain of water is moved radially inwardly by the air updraft and is picked up by the first disc 94 and centrifugated radially to the inside wall of the column 34'''. It then runs down and is collected by the next lower baffle 36'' for the repeat of this operation at successive lower levels.

Finally, the water cascades into the tray 10 within the lowermost column section where incoming air first passes through a curtain of water. During humidification by this counter-current flow the ports 56 can be opened by pivoting the covers 58 to one side and allow part of the humidified air to cycle downwardly and mix with air moving toward the inlets 28. Thus, both air and water are recycled in accordance with the cyclometric method of this invention. This eliminates short cycling of air. With the ports 56 open some water is splashed through these openings and falls down into the tray 10 which extends radially beyond the top misting tray 46.

By using a down draft fan or reversal of the fan 82 on the shaft 80 co-current contact of the air and water can be carried out in accordance with this invention. Air would then pass into the openings 66, down the column and out the openings 28. Cycling of the air back into the system is accomplished by opening the ports 56. Updraft is preferred since it permits a disc size that telescopes through the baffles without misting loss. With downdraft the discs must be larger and made of flexible rubber.

By way of understanding the relative sizes of air flow passages, water volumes for homes and offices of different sizes in various geographic locations, it should be noted that the absolute humidity of air is the actual weight of water vapor in the air, expressed in grains or pounds per cu. ft., and does not alone indicate the relative dryness or moistness of the air without knowing the air temperature. Relative humidity (RH) is the ratio of the absolute humidity at a given temperature to the absolute humidity corresponding to its maximum moisture capacity at that temperature. The dew point (DP) is a true measure of the moisture content of the air and is the temperature at which the air becomes saturated if cooled to that temperature with no addition or subtraction of water and is a constant at any given moisture content. The dew point of air can only be increased by adding water vapor to unsaturated air.

The amount of water desired can thus be computed. The rate of evaporation of water is dependent upon several factors including the water temperature, the air temperature, the partial vapor pressures of the air and water vapor and essentially for this invention the rate and intimacy of contact between the air and water in the humidifier, certain minimum dimensional limitations attach to the design of a co-current and counter-current humidifier which involves air volume and velocity.

If the air in a room has a 50° F. DP and contains 4 grains of water vapor per cu. ft. of 70° F. air, the RH is 50%. In order to raise the RH to 60%, one grain of water vapor must be added per cu. ft. of air at 70° F. and the dew point will rise to 55° F. A room containing 2000 cu. ft. of 70° F. air at this RH would require 2000 grains of water vapor to bring the RH to 60%, discounting heat load changes and similar factors. The purpose of humidifying is to maintain a constant RH within a room space without cooling the spray water through which the air circulates. Under normal humidifying conditions the dry-bulb temperature of the space cannot be controlled. Therefore, to determine the volume of air required to be circulated per unit of time for a given space, the desired relative humidity and heat load must be known. The action of humidifying is one in which air, saturated at the wet bulb temperature, in the humidifying chamber, absorbs heat from the humidified space to raise its dry-bulb temperature, thereby lowering its RH. Conversely to raise the RH to a desired level, the DB temperature must be decreased proportionately.

Using psychrometric charts and known dew point depressions for various RH values, the number of cubic feet per minute of air required to maintain a given RH in a space having a known heat load or the volume of air required to maintain a desired temperature and humidity condition within a heated or cooled space can be readily calculated. These values for the average room will run about 2000 to 5000 cubic feet per minute and excluding other losses will require the presence of about 5 grains moisture per cu. ft. of air at 70° F. to maintain 60% RH. At this temperature the latent heat of evaporation of water is 1052.7 B.t.u. per lb. The latent heat contained in the air corresponds to the weight of water vapor present. The heat of vaporization required to evaporate the water in the column 34 is taken from the air passing therethrough. Accordingly, the rate of water circulation by the pump 90 should be at least sufficient to absorb the latent heat of the air being circulated through the column and is preferably in excess thereof by at least about 10% so that some water returns into the section 24. This provides also for filter wash. For best efficiency and in order to maintain a higher rate of latent heat transfer a sufficient excess amount of water is circulated to maintain a falling film or curtain of water around the edge of each opening 54 to 38 throughout the column.

With volume adjustable through variable exhaust openings 66 and with a constant speed shrouded propeller-type fan, the flow areas of the column should be considered. Assuming a column in which each section has an inside diameter of 1 ft. and a cross-sectional area of 113 sq. in. and taking into account the tubular shaft area, about 1.7 sq. in. for a shaft of 1.5 in. O.D., the effective flow area of the column is about 111 sq. in. with no baffles or discs therein. Halving the total flow area around the discs 94 and the area through the openings 54, each would be 9 inches in diameter. The effective flow area would be 56 sq. in. and since the flow area between the baffles and the discs is the lateral area of a cylinder having a perimeter of about 28 in. and a lateral area of 2+ in. each column section may be 4 to 5 inches high, shallow enough to vacuum draw. This flow area can be increased with updraft flow as much as 25% by increasing the openings 54 to 10 in. diameter and the section height to 5 in. With this latter, the telescoping assembly of discs and baffles is quite easy and the flanges 36 establish a high degree of turbulence as well as rapidly collecting and discharging the water for successive mistings.

In the selection of a fan for this flow area the efficiency and tip speed requirements are prime considerations in relation to the size of fan. It is known in the art that where a given fan is operating with a given restriction, such as the column 34′ on its inlet or the cover 62 on the outlet, the volume delivered will vary directly with the r.p.m. (N), the various pressures will vary as $N^2$, and the air horsepower as $N^3$.

It is preferred to provide a working velocity of 1200 ft. per minute and with the flow area 78 sq. in., 600 cu. ft. supplied with a fan speed of 875 or 1750 r.p.m. is desired so that the misting action of the discs will be quite high. Such a fan can be selected as well as the motor horsepower for the performance noted and not only will the 70° air volume circulated be high but the turbulenece and the mixing contact will be excellent. Moreover, from these proportions other sizes and capacities of humidifiers can be ascertained depending on the space size and the continuing loss of humidity experienced in the space considered.

Figure 2:
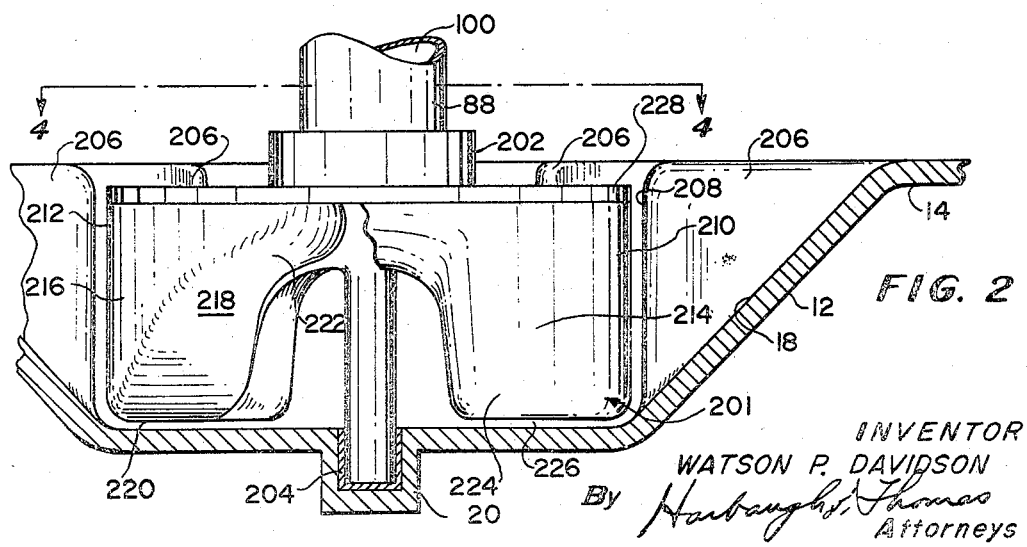
FIG. 2 is a side perspective view of one form of impeller used in conjunction with the circulating pump system of this invention.

In accordance with one embodiment of this invention the pumping action necessary to supply the head of water in the bore 100 and to continuously supply the bores 106 and 108 with water is produced by the impeller 201 shown in FIG. 2 which may replace the pump 90. The shaft 88 having the conduit 100 therethrough is connected to the impeller 201 by means of a suitable collar 202. The impeller operates within the well 18, and is supported by the nylon bearing insert 204 in housing 20. The well 18 has a series of spaced radial vanes 206 having their inner edges 208 closely spaced from the outer edges 210 and 212 of the lobes 214 and 216. The open end 218 of the lobe 216 is shown with a leading knife edge 220 along the side and bottom and a gradually ascending inwardly curved wall 222 communicating at the center with the bore 100.

The back side 224 of the lobe 214 is shown since its opening is 180° from the opening 218 and facing the opposite direction. Each of the lobes 214 and 216 is spaced, as at 226, above the bottom of the well 18. The top 228 is oblong or elliptical in shape and forms an enclosure across the lobes. Further details of this embodiment are shown in FIG. 4 wherein the top 228 is shown in phantom to expose the scoop-like opening 218 of each lobe of the impeller, the gradually narrower inclined inner surface 222 spiralling into the bore 100 with each lobe having a base 230 at the vortex which is oppositely concave and swirls the water into a rotating column within the bore 100. Referring to FIG. 3, this rising column of water, lifted either by the pump 19 or the impeller 201, passes through the bore 100 against the central generally conical divider 300 in the base 302 of the modified form of coupler 86.

The base 302 and the divider 300 define therein two or more L-shaped passageways 304 and 306 placed at 180° on the circumference of the base 302 and in communication with the bores 106 and 108 of the centrifugal misting tubes 102 and 104. The coupler 86 has a collar 310 with a central bore 312 to receive the shaft 80 and a transverse notch 316 to receive the drive pin 318 affixed to the shaft 80. This locks the shaft 80 for rotation of the coupler 86 and allows easy disassembly, simply by means of longitudinal separation of these parts. This is accomplished simply by lifting the motor 72 and the shaft 80 upwardly, with or without the simultaneous removal of the cover 62.

In accordance with one embodiment of this invention the parts of the liquid-vapor contactor are formed of synthetic resins of the thermoplastic variety that may be softened by heat molded or vacuum formed and then regain their original properties upon cooling. Examples are vinyl resins, polystyrene, modified polystyrene, fluorothene, methacrylic and acrylic ester polymers, acrylonitrile, polyvinyl alcohol, polyvinyl acetals, vinyl acetate, vinyl chloride, and copolymers of vinyl chloride such as vinyl chloride-vinyl acetate, and vinyl chloride-vinylidene chloride. These plastics are preferred because of their essential hardness, chemical resistance and low moisture absorption. If desired the plastics can be partially foamed or filled to add desired properties. The plastics used are formulated to give an essentially rigid structure with only sufficient flexibility to allow ease in assembly. Thermosetting materials such as the phenolics can also be used. In the preferred embodiment a thermoplastic material is used which can be vacuum drawn and readily trimmed or finished to form tight fitting joints. The parts may also be a form of metal, such as aluminum.

The vapor-liquid contactor of this invention is preferably dimensioned such that assembly and disassembly are facilitated. Thus, the outer diameters of the pump 90 and the discs 94 (and the misting tubes 102 and 104) are such that they may be received through the baffle openings 38, 38″ and 54 respectively. The discs 94 can be of relatively flexible plastic of the same diameter or rigid material of lesser diameter than the baffle openings. This allows placement of the shaft 88 with the end 92 in the housing 20, insertion of the lower section 24 thereover and the subsequent assembly of the sections 34 thereon. The shaft 88 can also be made of plastic, preferably of a more rigid variety, i.e. a thermosetting plastic. Where the temperature of the environment is above or below ambient conditions plastics which retain their rigidity and body under these more extreme conditions are used.

If desired, the relative size of the baffle openings can be varied throughout the column so as to control the velocity of flow of vapors therethrough and the relative volume per unit of area of cascading liquid. Other variations can be made. By using a reversible motor 72 the direction of the passage of vapors through the apparatus can be controlled.

What is claimed is:
1. A liquid-vapor contactor for vapors within an environment comprising
 (a) a liquid reservoir having a supporting bottom,
 (b) a tubular column extending upwardly from and supported by said bottom,
 (c) the lowermost portion of said column having an open bottom with side openings therethrough to admit liquid from said servoir and vapors from said environment,
 (d) the succeeding portions of said column having vertically spaced inwardly depending frusto-conical baffle walls defining at their inner margins central openings,
 (e) an enclosed misting chamber at the top of said column having a diameter larger than said column with a frusto-conical bottom baffle wall defining at its inner margin a central opening axially aligned with the central openings of said column sections, said misting chamber having top openings therein,
 (f) a rotatable shaft extending substantially centrally of said openings from said reservoir to said misting chamber, said shaft having a longitudinal inner bore,
 (g) a series of discs affixed to said shaft and spaced above and below said baffles within said column,
 (h) at least a pair of balanced radial misting nozzles affixed to said shaft and spaced above the bottom of said misting chamber, said nozzles having longitudinal bores in communication with the inner bore of said shaft,
 (i) a fan affixed to the top of said shaft for moving said environmental vapors through said column and misting chamber via said top, central openings,
 (j) pump means engaged by the bottom of said shaft having its inlet in communication with said reservoir and its discharge in communication with said inner bore of said shaft,
 (k) and means to rotate said shaft.

2. A liquid-vapor contactor in accordance with claim 1 in which said column portions are substantially cylindrical sections and said baffle walls extend inwardly and downwardly from the bottom edge thereof, said bottom edge having a circumferential shoulder adapted to engage and be supported by the peripheral top edge of the next lower column section.

3. A liquid-vapor contactor in accordance with claim 2 which is readily assembled and disassembled wherein each of said rotatable discs has an outer diameter less than the inner diameter of the central opening of any baffle through which it must be passed in assembly or disassembly.

4. A liquid-vapor contactor in accordance with claim 1 which is readily assembled and disassembled wherein each of said rotatable discs is flexible to pass through the inner diameter of the central opening of any baffle through which it must be passed in assembly or disassembly.

5. A liquid-vapor contactor in accordance with claim 1 in which the total volumetric flow capacity of the longitudinal bores in said nozzles is substantially equal to the volumetric flow capacity of the bore in said shaft whereby the centrifugal action of said nozzles augments the pumping action of said pump means.

6. A liquid-vapor contactor for vapors within an environment comprising:
 (a) a liquid reservoir having a supporting bottom,
 (b) a tubular column extending upwardly from and supported by said bottom,
 (c) the lowermost portion of said column having an open bottom with side openings therethrough to admit liquid from said reservoir and vapors from said environment,
 (d) the succeeding portions of said column having vertically spaced inwardly depending frusto-conical baffle walls defining at their inner margins central openings,
 (e) an enclosed misting chamber at the top of said column having a diameter larger than said column with a frusto-conical bottom baffle wall defining at its inner margin a central opening axially aligned with the central openings of said column sections, said misting chamber having top openings therein,
 (f) a rotatable shaft extending substantially centrally of said openings from said reservoir to said misting chamber, said shaft having a longitudinal inner bore,
 (g) a series of discs affixed to said shaft and spaced above and below said baffles within said column,
 (h) at least a pair of balanced radial misting nozzles affixed to said shaft and spaced above the bottom of said misting chamber, said nozzles having longitudinal bores in communication with the inner bore of said shaft,
 (i) a fan affixed to the top of said shaft for moving said environmental vapors through said column and misting chamber via said top central openings, (j) pump means engaged by the bottom of said shaft having its inlet in communication with said reservoir and its discharge in communication with said inner bore of said shaft, (k) said pump means having a balanced lobed impeller affixed to a hollow hub at the end of said shaft, said lobes having openings in the direction of rotation thereof and means defining inclined inwardly spiralling chambers connecting from said openings to said hollow hub and a walled sump surrounding said impeller with radial vanes extending inwardly from said wall and spaced radially and circumferentially from the outer periphery of said impeller, (l) and means to rotate said shaft.

7. A liquid-vapor contactor in accordance with claim 1 in which said tubular column portions, said misting chamber, said liquid reservoir, and said shaft assembly are detachably mounted within and upon each other in nested relationship.

8. A liquid-vapor contactor in accordance with claim 1 in which said liquid reservoir has a series of circumferentially spaced retaining shoulders in the bottom thereof which slideably engage the outer surface of the lower edge of said lowermost column portion and means are provided to centrally support said shaft and support said means to rotate same within said misting chamber and the bottom of said liquid reservoir.

9. A humidifier comprising, in combination (a) a water reservoir having a downwardly and inwardly sloping bottom communicating with a sump therein, said sump having a wall formed in said bottom with a series of circumferentially spaced inwardly directed vanes therearound, (b) a series of retaining shoulders in said bottom and radially spaced from the wall of said sump and a central bearing housing therein, (c) a sectional cylindrical column supported by said bottom of said reservoir, the lowermost of said sections having air inlet through the wall thereof and the bottom edge engaged and centered within said retaining shoulders, (d) the succeeding sections of said column comprising separate axially aligned nested cylindrical members having frusto-conical downwardly depending bottom baffle walls defining at the inner margins a series of vertically spaced aligned central openings and having at their outer bottom edges a circumferential shoulder adapted to nest upon the topmost edge of the next lower column section, (e) a misting chamber at the top of said column having a detachable cover member thereover comprising an inner downwardly depending circumferential air baffle, air ducts through said cover member within said air baffle, a motor housing central of said cover member and said chamber having a frusto-conical downwardly depending bottom wall defining at its inner margin a central opening axially aligned with the central openings of said column sections with a circumferential shoulder at the peripheral edge engaging invested relationship the top edge of the top column section, (f) a motor mounted within said motor housing, (g) a drive shaft extending from said motor carrying intermediate its end a fan operating within said circumferential air baffle, (h) a detachable transverse pin coupler connecting the extended of said shaft to a hollow shaft extending through the central openings of said column sections and supported in said bearing housing, (i) at least a pair of balanced radial misting nozzles affixed to said coupler and having longitudinal bores in communication with the bore in said hollow shaft and having a total volumetric flow equivalent to that of said hollow shaft, (j) a series of discs affixed to said hollow shaft and spaced below said baffle walls within said column and spaced above the next lower baffle therein each of said discs having an outer diameter less than as the inner diameters of said central openings of said baffles, (k) a balanced lobed impeller affixed to a hollow hub in said sump at the end of said shaft, said lobes having openings in the direction of rotation thereof and means defining upwardly inclined inwardly spiralling chambers connecting from said openings to said hollow hub with the outer edges of said openings being radially spaced from said radial vanes therearound.

10. A humidifier in accordance with claim 9 in which the central openings in said column and said air ducts provide an air flow path at least equivalent to the delivery rate of said fan.

11. In combination a centripetal pump, a centrifugal pump vertically spaced therefrom, a conduit interconnecting the outlet of said centripetal pump with the inlet of said centrifugal pump, said centrifugal pump comprising radially directed misting tube means communicating with said inlet, means for supplying liquid to the inlet of said centripetal pump, means for driving said pumps simultaneously including the rotation of said misting tube means to aid the centripetal pump in pumping a full flow of water, said driving means including said conduit, a column around said conduit having vertically spaced baffles therein and receiving liquid from said centrifugal pump, vertically spaced discs on said conduit alternating with said baffles, and means for forcing air through said column.

12. The combination of claim 11 wherein (a) said centrifugal pump comprises a lobed impeller affixed to a hollow hub at the end of said conduit, said lobes having openings in the direction of rotation thereof and means defining inclined inwardly spiralling chambers connecting from said openings to said hollow hub and a walled sump surrounding said impeller with radial vanes extending inwardly from said wall and spaced radially and circumferentially from the outer periphery of said impeller.

References Cited

UNITED STATES PATENTS

| 798,880 | 9/1903 | Cramer | 261—88 X |
| 971,481 | 9/1910 | Anthony | 261—89 X |
| 1,079,849 | 11/1913 | Ernst | 261—89 X |
| 2,273,341 | 2/1942 | Vollmer | 261—91 X |
| 2,432,247 | 12/1947 | McAnallen | 103—95 |
| 2,729,544 | 1/1956 | Pieters | 261—84 X |
| 1,266,966 | 5/1918 | McEwen | 261—29 X |

HARRY B. THORNTON, Primary Examiner

S. H. MARKOWITZ, Assistant Examiner

U.S. Cl. X.R.

55—223, 230, 229, 240, 247; 261—88